US009594573B2

(12) United States Patent
Chen et al.

(10) Patent No.: US 9,594,573 B2
(45) Date of Patent: Mar. 14, 2017

(54) SYSTEMS AND METHODS OF BLOCK COMPUTATION

(75) Inventors: Qiming Chen, Cupertino, CA (US); Meichun Hsu, Los Altos Hills, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 330 days.

(21) Appl. No.: 13/007,487

(22) Filed: Jan. 14, 2011

(65) Prior Publication Data

US 2012/0185460 A1   Jul. 19, 2012

(51) Int. Cl.
G06F 17/30 (2006.01)
G06F 9/44 (2006.01)

(52) U.S. Cl.
CPC ...... G06F 9/4421 (2013.01); G06F 17/30477 (2013.01); G06F 17/30516 (2013.01); G06F 17/30545 (2013.01); G06F 17/30595 (2013.01); G06F 17/30926 (2013.01)

(58) Field of Classification Search
CPC ......... G06F 17/30519; G06F 17/30516; G06F 17/30545; G06F 17/30914; G06F 17/30463; G06F 17/30445; G06F 17/30477; G06F 17/30474; G06F 17/30457; G06F 17/30926; G06F 17/30595
USPC ........ 707/718, 737, 762, 770, 966; 711/133, 711/134, 159, 160; 717/124, 130
See application file for complete search history.

(56) References Cited

U.S. PATENT DOCUMENTS

| 5,557,791 | A | * | 9/1996 | Cheng et al. | |
| 6,278,994 | B1 | * | 8/2001 | Fuh et al. | |
| 6,341,289 | B1 | * | 1/2002 | Burroughs et al. | 707/737 |
| 6,353,818 | B1 | * | 3/2002 | Carino, Jr. | |
| 7,984,043 | B1 | * | 7/2011 | Waas | 707/718 |
| 2003/0037048 | A1 | * | 2/2003 | Kabra et al. | 707/4 |
| 2004/0205082 | A1 | * | 10/2004 | Fontoura et al. | 707/101 |
| 2008/0114803 | A1 | * | 5/2008 | Chinchwadkar et al. | 707/102 |
| 2009/0228465 | A1 | * | 9/2009 | Krishnamurthy et al. | 707/4 |
| 2010/0223437 | A1 | * | 9/2010 | Park et al. | 711/159 |

OTHER PUBLICATIONS

Stavros Harizopoulos et al. "QPipe: A Simultaneously Pipelined Relational Query Engine", SIGMOD ACM, 2005, pp. 1-12.*
Chen, et al., "Exend UDF Technology for Integrated Analytics", Proc. 10th Int. Conf. on Data Warehousing and Knowledge (DaWaK '09). 2009.
Jaedicke, et al., "User-Defined Table Operators: Enhancing Extensibility of ORDBMS", VLDB 1999.
Hsu, et al., "Generalized UDF for Analytics inside Database Engine", 11th International Conference WAIM 2010.
Wu, et al., "GPU-Accelerated Predicate Evaluation on Column Store", 11th International Conference WAIM 2010.
Chen, et al., "Experience in Extending Query Engine for Continuous Analytics", Proc. 11th Int. Conf. on Data Warehousing and Knowledge Discovery (DaWaK '10). 2010.

* cited by examiner

*Primary Examiner* — Srirama Channavajjala
(74) *Attorney, Agent, or Firm* — Michael A. Dryja

(57) ABSTRACT

Systems and methods of block computation are disclosed. An example of a method includes buffering a plurality of tuples in a build phase. The method also includes, after buffering a last of the plurality of tuples, applying a computation to all of the buffered tuples in a compute phase. The method also includes returning results of the computation one tuple at a time to a query processing pipeline in a stream-out phase.

20 Claims, 5 Drawing Sheets

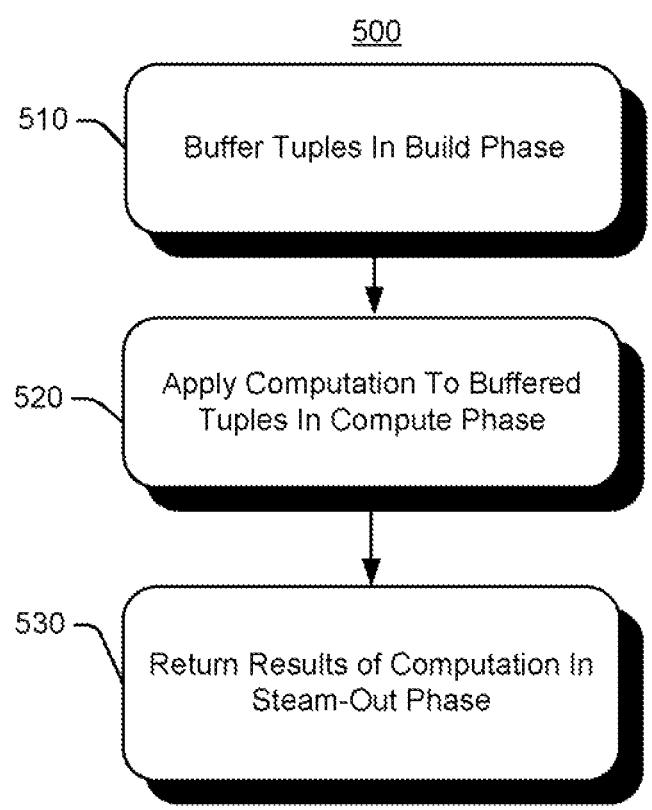

SYSTEMS AND METHODS OF BLOCK COMPUTATION

BACKGROUND

Mobile devices, including for example mobile phones (so-called "smart" phones), global positioning system (GPS) devices, laptop/netbook/tablet computers, to name only a few examples, provide diverse remote data capabilities. Many mobile applications are based on so-called "cloud" services, such as location services, messaging services, and so forth. Currently many cloud services are based on statically prepared information, and do not offer real-time analytics of dynamic events. Cloud services that do offer computation capabilities fail to provide fast data access and data transfer ability.

The current technology has several limitations in both expressive power and efficiency. Existing database services offer scalar, aggregate and table functions (table functions are also known as table-valued functions, or "TVF"), where the input of a scalar or table function can only be bound to the attribute values of a single tuple (a "tuple" is an ordered list of elements). An aggregate function is actually implemented as incremental per-tuple manipulations. These computations lack formal support for tuple-set input.

However, many computations rely on a set of tuples, and therefore have to be input one tuple at a time. An example is a graph having multiple arcs with each arc represented by an individual tuple. The graph is represented by a set of tuples, and therefore a minimal spanning tree (MST) computation can only be computed upon receiving the entire tuple set. Another example is a document having multiple sentences with each sentence represented by an individual tuple. Of course there are many more examples of computations that cannot be performed until after all tuples in the tuple set are received.

Further, the computation may need to be executed by an external engine that is outside of the database query engine, e.g., through procedural calls or by copying data back and forth. Per-tuple procedural calls and data copying by an external engine incurs significant performance penalties.

BRIEF DESCRIPTION OF THE DRAWINGS

FIG. 5 is a flowchart illustrating example operations which may be implemented for block computation.

DETAILED DESCRIPTION

Pushing data-intensive computation down to the data management layer improves data access and reduces data transfer, particularly in mobile environments. The fast growing volume of data and the continuing desire for low latency data operations often means having the data intensive analytics executed by the computation engine. Integrating applications and data management can by accomplished by wrapping computations as User Defined Functions (UDFs) executed in the query processing environment. The input data may be vectorized in the UDF for batch processing to provide performance advantages.

In order for UDFs to be used in a scalable approach for dealing with complex applications, the UDFs should be sufficiently general to handle block operators in the tuple-wise query processing pipeline. The systems and methods disclosed herein define both semantic and system dimensions to support Set-In, Set-Out (SISO) UDFs for block computation. A SISO UDF receives input for computation in a tuple-by-tuple fashion from a dynamic query processing pipeline. A set of N tuples is blocked before batch analytic computing. A materialized result set is then obtained, and the result is output in a pipeline manner, tuple-by-tuple.

This approach allows the UDF to define operations for a set of tuples representing a single object (e.g., a graph or an entire document), or corresponding to a single time window. SISO UDFs block computation operators enable modeling applications definable on tuple-sets rather than on individual tuples. This approach also allows the computation to be launched by services outside of the query engine (e.g., on an analysis engine such as SAS engine or a computation node in a cluster) for efficient batch processing. In an example of block computation, support for the SISO UDF may be implemented in an SQL engine by extending the function invocation skeleton, and by extending the UDF accessible state hierarchically in the memory context of function execution.

Figure 1:
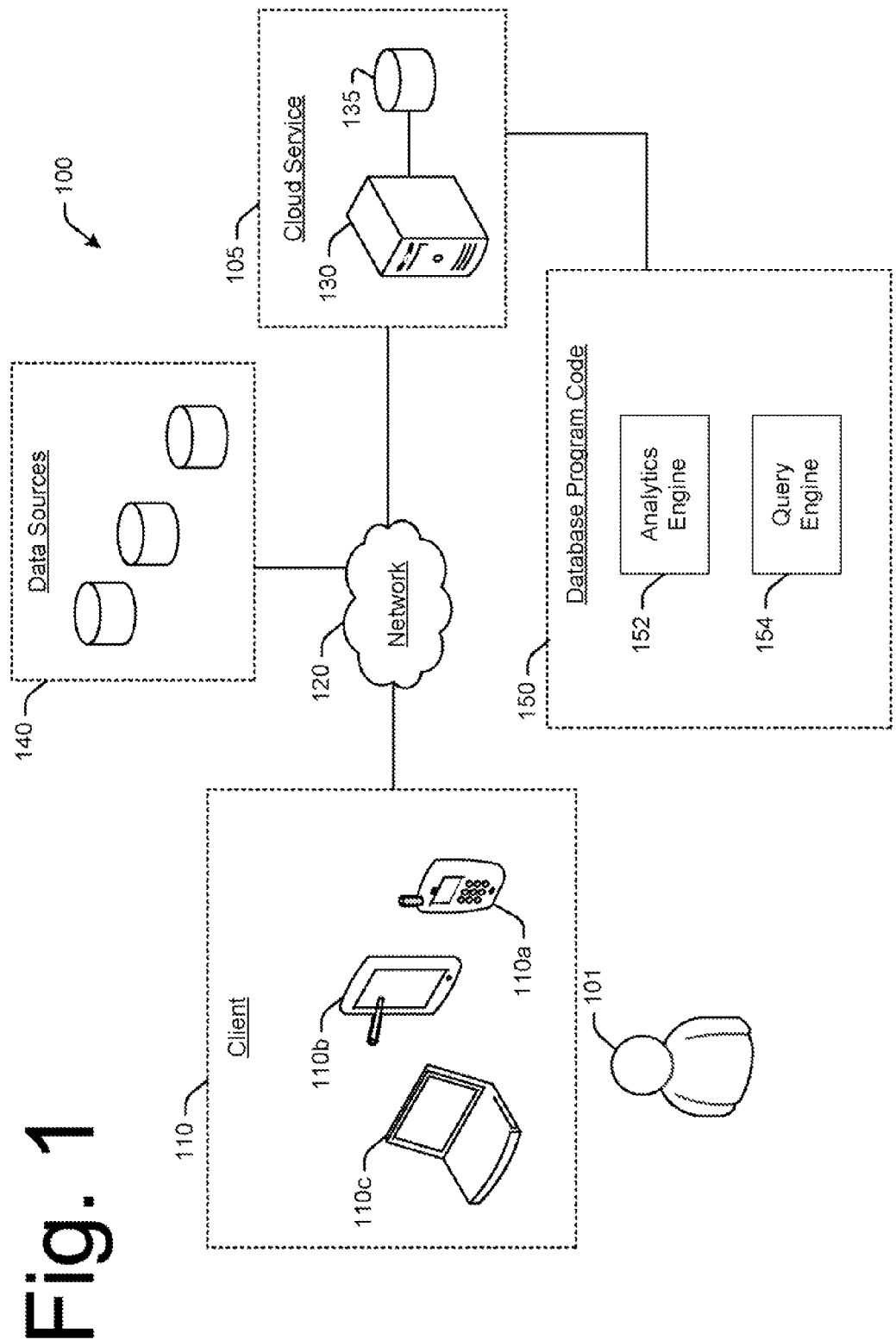
FIG. 1 is a block diagram of an example networked computer system which may implement block computation.

FIG. 1 is a block diagram of an example networked computer system 100 which may implement block computation. The networked computer system may include a cloud service 105 accessed by a user 101 on a client device 110, such as a mobile device. For purposes of illustration, the cloud service 105 may be a data processing service, such as a real-time traffic service. Client 110 may be a mobile phone 110a (e.g., a smart phone), a tablet 110b, or a laptop/netbook computer 110c. In other examples, however, the client 110 may refer to other types of computing device now known or later developed. Although described herein with reference to a mobile device, the client 110 is not limited to use with any particular type of device.

The networked computer system 100 may include one or more communication networks 120, such as a local area network (LAN) and/or wide area network (WAN). In one example, the networks 120 include the Internet or other mobile communications network (e.g., a 3G or 4G mobile device network).

A host 130 may be implemented with (or as part of) the cloud service 105 in the networked computer system 100. As an example, host 130 may include one or more computing systems, such as a personal computer or server computer, and may include at least some degree of processing capability and computer-readable storage. The host 130 is also connected to, or able to establish a connection with, the client 110. By way of example, the host 130 may be a server computer or a plurality of server computers.

The host 130 may be provided on the network 120 via a communication connection, such as via an Internet service provider (ISP). In this regard, host 130 may be accessed by the client 110 directly via the network 120, or via an agent, such as a network site. In an example, the agent may include a web portal on a third-party venue (e.g., a commercial Internet site), which facilitates a connection for one or more clients with host 130. In another example, portal icons may be provided (e.g., on third-party venues, pre-installed on a computer or mobile device, etc.) to facilitate a communications connection between the client 110 and the host 130.

Before continuing, it is noted that the systems and methods described herein may be implemented with any of a wide variety of computing devices, such as, but not limited to, stand-alone personal desktop computers, workstations, personal digital assistants (PDAs), and appliances (e.g., devices dedicated to providing a service), to name only a few examples. Each of the computing devices may include memory, storage, and a degree of data processing capability at least sufficient to manage a communications connection either directly with one another or indirectly (e.g., via a network).

The host 130 may be implemented to receive data from at least one source 140. The source 140 may be part of the cloud service 105. Or the source 140 may be distributed in the network 120. For example, the sources may gather data from one or more sensors (e.g., traffic monitoring locations along a road, or sensors provided with the GPS systems in vehicles). The source 140 may also include user-generated data. An appropriate filter may be applied, e.g., to discard "bad" data (e.g., intentional misinformation provided by users). There is no limit to the type or amount of data. The data may be unprocessed or "raw," or the data may undergo at least some level of processing prior to delivery to the host 130. It is noted that the host 130 is not limited in function. The host 130 may also provide other services to other computing or data processing systems or devices. For example, host 130 may also provide transaction processing services, email services, etc.

The host 130 may execute database program code 150. In an example, the database program code 150 may include a computation or analytics engine 152 and a query engine 154. In an example, the computation engine 152 may be an SQL-based stream analytics engine, and the query engine 154 may be an SQL query engine. The computation engine 152 may be integrated into the query engine 154.

The host 130 may execute analytics for the data to generate results based on the data. Running computations inside the computations engine 152 at the host 130 can be accomplished through the use of User Defined Functions (UDFs). Running analytics computation through the use of UDFs has been investigated before, but has not been a scalable approach for dealing with complex applications. One reason is the lack of generality for UDFs to handle block operators in the tuple-wise query processing pipeline. The systems and methods described herein extend UDF technology in both semantic and system dimensions to support Set-In, Set-Out (SISO) UDFs for block computation.

Figure 2A:
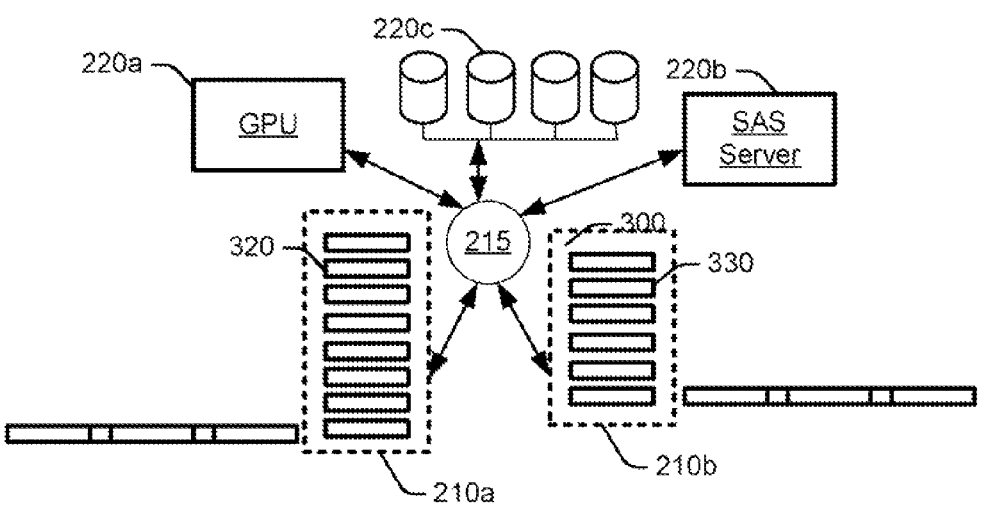
FIG. 2a is a high-level illustration of different phases of block analytics.

FIG. 2a is a high-level illustration of different phases 201-203 of block analytics. In an example, a SISO UDF receives data during a build phase 201. The data is input tuple-by-tuple from a dynamic query processing pipeline 205a via computation engine 215. The SISO UDF blocks a set of N tuples 210 before batch analytic computing during the build phase 201. For tuples $t_1, t_2, \ldots t_N$ a Null value is returned, thereby acting as a scalar function. During a compute phase 202, the SISO UDF obtains a materialized result set 205b. For tuple $t_N$, the SISO UDF acts as a table function. The first call runs the computation on the tuples $t_1, t_2, \ldots t_N$.

The host may maintain the results of the analytics in at least one data structure (e.g., a table in computer-readable media 135 in FIG. 1). The data structure may be accessed by the clients in a streamout phase 203. For example, the client may be executing a mobile application which retrieves the results of the analytics from the host and outputs the results for the user at the client (e.g., on the mobile phone 110a in FIG. 1).

In the streamout phase 203, the SISO UDF outputs the result set 210b in a pipeline manner, tuple-by-tuple or one tuple at a time. This approach allows the SISO UDF to define operations for a set of tuples representing a single object (e.g., a graph or an entire document) corresponding to a single time window. SISO UDFs block computation operators enable modeling applications definable on tuple-sets rather than individual tuples.

Figure 2B:
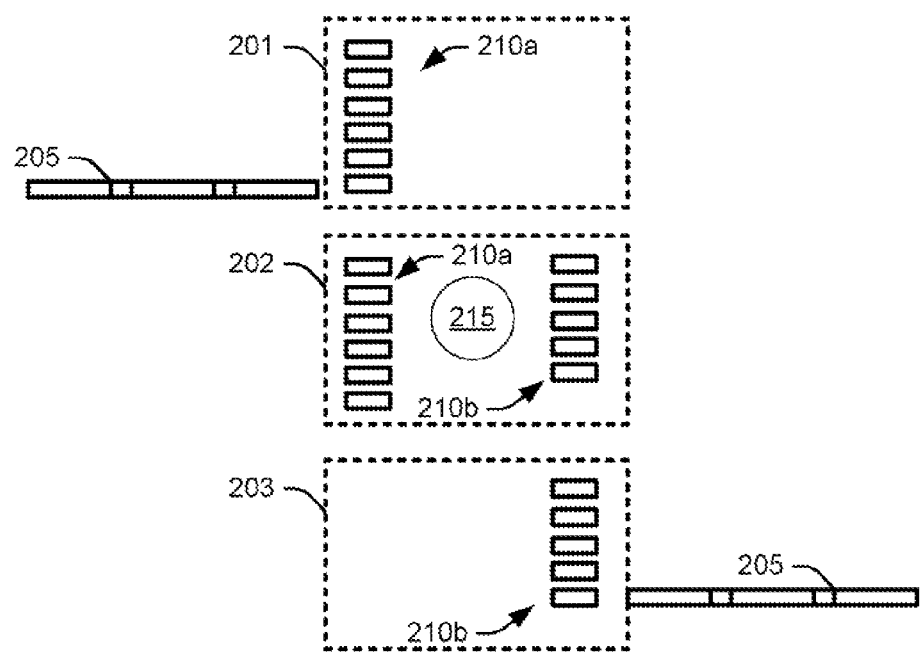
FIG. 2b is a high-level illustration of an example of block analytics performed by internal and external engines.

FIG. 2b is a high-level illustration of an example of block analytics performed by internal and external engines 220a-c. The SISO UDF approach may be implemented using a database engine (e.g., the global processing unit (GPU) 220a). The SISO UDF approach described above also allows the computation to be launched by services outside of the query engine. For example, services may be provided by an analysis engine such as SAS server 220b, or by a computation node 220c in a cluster for efficient batch processing. In an example, support for the SISO UDF may be implemented in an SQL engine by extending the function invocation skeleton, and by extending the UDF accessible state hierarchically in the memory context of function execution.

Figure 3:
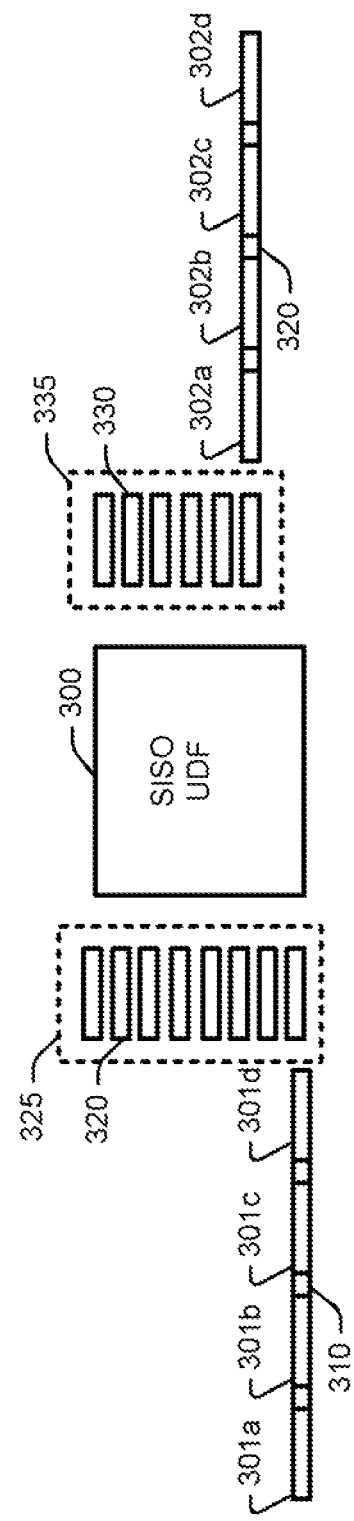
FIG. 3 is a high-level illustration of a Set-In, Set-Out (SISO) user defined function (UDF) for block analytics.

FIG. 3 is a high-level illustration of a SISO UDF 300 for block analytics. In an example, a SISO UDF 300 is characterized as follows. The data is input and received on a tuple-by-tuple basis (e.g., tuples 301a-d) from an input query processing pipeline 310. A set of tuples is pooled and "ETLed" as a granule 320 (e.g., in a buffer 325) before batch analytic computing begins. In this sense, a SISO UDF 300 is a block operator. A granule 320 enables batch processing the set of N tuples 301a-d, modeling a single object, or a list of tuples falling in a given time window. The computation results 330 are materialized (e.g., copied back from GPU memory or the SAS program) in the memory context 335 of the SISO UDF. The results 330 can then be returned via an output query processing pipeline 320 on a tuple-by-tuple basis (e.g., as individual tuples 302a-d).

While conceptually featured as a set-in, set-out UDF, a SISO UDF accomplishes such a feature in terms of multiple calls. For example, the SISO UDF (vectorize( ), may be invoked according to the following illustration. First, vectorize(x,y,10) is selected from a source table (e.g., point_table). The source table (point_table) has tree attributes (pid, x, y) where a pid value identifies a point, and x, y gives the coordinates of the point. The SISO UDF (vectorize(x,y, 10)) reads the x, y values of each point tuple, and buffers ten tuples. The SISO UDF then carries out the designated computation on the batch of ten tuples, and returns the computation result tuple-by-tuple. In this way, the set-in, set-out behaviour of the SISO UDF includes the collective behavior in handling the chunk of ten input tuples. Since the SISO UDF is executed in the extended table function framework, the SISO UDF handles each tuple through multiple calls, potentially with each call delivering a single return tuple.

Continuing with this example, let us denote a chunk of ten tuples as $t_2, \ldots t_{10}$. The SISO UDF, vectorize(x, y, 10), is executed in three phases: a build phase, a compute phase, and a streamout phase. During the build phase, the tuples $t_1, t_2, \ldots t_{10}$ are "ETLed" and buffered. Input tuples $t_1, t_2, \ldots t_9$ are called "per-tuple" as in a scalar function, but each call returns a Null value.

After $t_{10}$, the last tuple in the chunk is buffered, and the function execution enters the compute-phase. During the compute phase, the computation is applied to the entire chunk of buffered data. The computation may be executed by the GPU, or an analytic program running outsides of the query engine. The resulting set is materialized.

During the streamout phase, the computation results are delivered one tuple at a time to the query processing pipeline.

Thus conceptually a SISO UDF is a block operator, because the SISO UDF does not deliver a return value until all the tuples in the designated data chunk are buffered. However, the data buffering is not static, but rather dynamically buffered along the query processing pipeline. The data is chunk-wise and unlikely to cover an entire relation. The chunking can be based on the number of tuples, the tuple data falling in a time-window, or used to represent an individual object. Further, chunking only applies to an individual SISO UDF, not to the entire query. In general, the data source of the host query can be either table or stream data.

For purposes of comparison, consider the following UDFs. A scalar UDF is defined as a one tuple in, one tuple out function, that can access a per-function state and per-tuple state. However, a SISO UDF is defined as a multiple-tuples in, multiple-tuples out operator. The SISO UDF is therefore able to access four level states: per-function, per-chunk, per-tuple (input), per-return.

A table UDF is one tuple in, multi-values/tuples out function that can access to per-tuple (input) state and per-tuple (return) state. The state corresponding to function invocation is dealt with by the query engine, but is inaccessible by the UDF. The SISO UDF is a multiple-tuples in, multi-tuples out operator.

SQL Aggregate Functions or User Defined Aggregate Functions (UDA) do not allow chunk-wise processing semantics, and there is no general form of set output (except combined with group-by) associated with aggregate functions. However, SISO UDFs are characterized by the chunk-wise processing semantics with flexible forms of set-wise output.

The query engine support certain block operator UDFs for hashing data, sorting data, etc. However, the data pooling is not based on application semantics, and is not controllable by users. With SISO UDFs, the input blocking is based on application semantics and controllable by users.

Relation Valued Functions (RVFs) load the input relation initially as static data, and the input relation is loaded entirely rather than chunk by chunk. In contrast, the input of a SISO UDF is chunk by chunk dynamically along the query processing pipeline.

Cycle-based queries continuously run a query cycle-by-cycle, for processing stream data chunk-by-chunk. The cycle execution is applied to the whole query, but is not specific to any particular operator or UDF. The SISO UDF supports block operation in an individual UDF, and not tuple by tuple processing.

As mentioned above, the SISO UDF provides a block function to pool data for using external services. Therefore, the SISO UDF has to be configured to deal with such block operators along the query processing pipeline (e.g., tuple-by-tuple query processing). Without the SISO UDF, there is no existing support framework. The scalar, table, and aggregate UDFs either lack set-input or set-output, and do not support chunking semantics at all.

The SISO UDF provides a hybrid behavior in processing every N input tuples. For tuples 1 and N−1, the SISO UDF is like a scalar function, with one call per input tuple. For tuple N, the SISO UDF is like a table function executed with multiple calls.

In order to better understand the SISO UDF, it is useful to briefly review the invocation skeletons of the scalar UDF and the table UDF. A scalar UDF is called multiple times; once for processing each single input tuple. In the first call, the per-function state is established with a certain data structure that can be shared, accessed and manipulated in each call, and retains across multiple calls. In each normal call, including the first call, one tuple is processed and the per-function state may be referred. In this way, a scalar UDF has two levels of accessible states; (a) the per-function state, and (b) the per-tuple state.

A table UDF is called for processing multiple input tuples. For processing each tuple, the table UDF is called multiple times for delivering multiple return tuples. Therefore the table UDF is also executed with a first call, multiple normal calls, and a last call for processing a single tuple. In the first call, the per-tuple state is established with a certain data structure that can be shared, accessed and manipulated in each call and retains across multiple calls. In each normal call, including the first call, one resulting tuple is returned. In this way, a table UDF has two levels of accessible states: (a) the per-tuple state, and (b) the per-return state.

In comparison, a SISO UDF has four levels of accessible states: (a) a per-function state, (b) a per-chunk state, (c) a per tuple state, and (d) a per-return state. Briefly, the per-function state maintains information for processing multiple chunks of input tuples. The per-chunk state maintains information for processing one chunk of input tuples. The per-tuple state maintains information for processing one input tuple, which may involve multiple calls. The per-return state is associated with delivering one return tuple.

Figure 4:
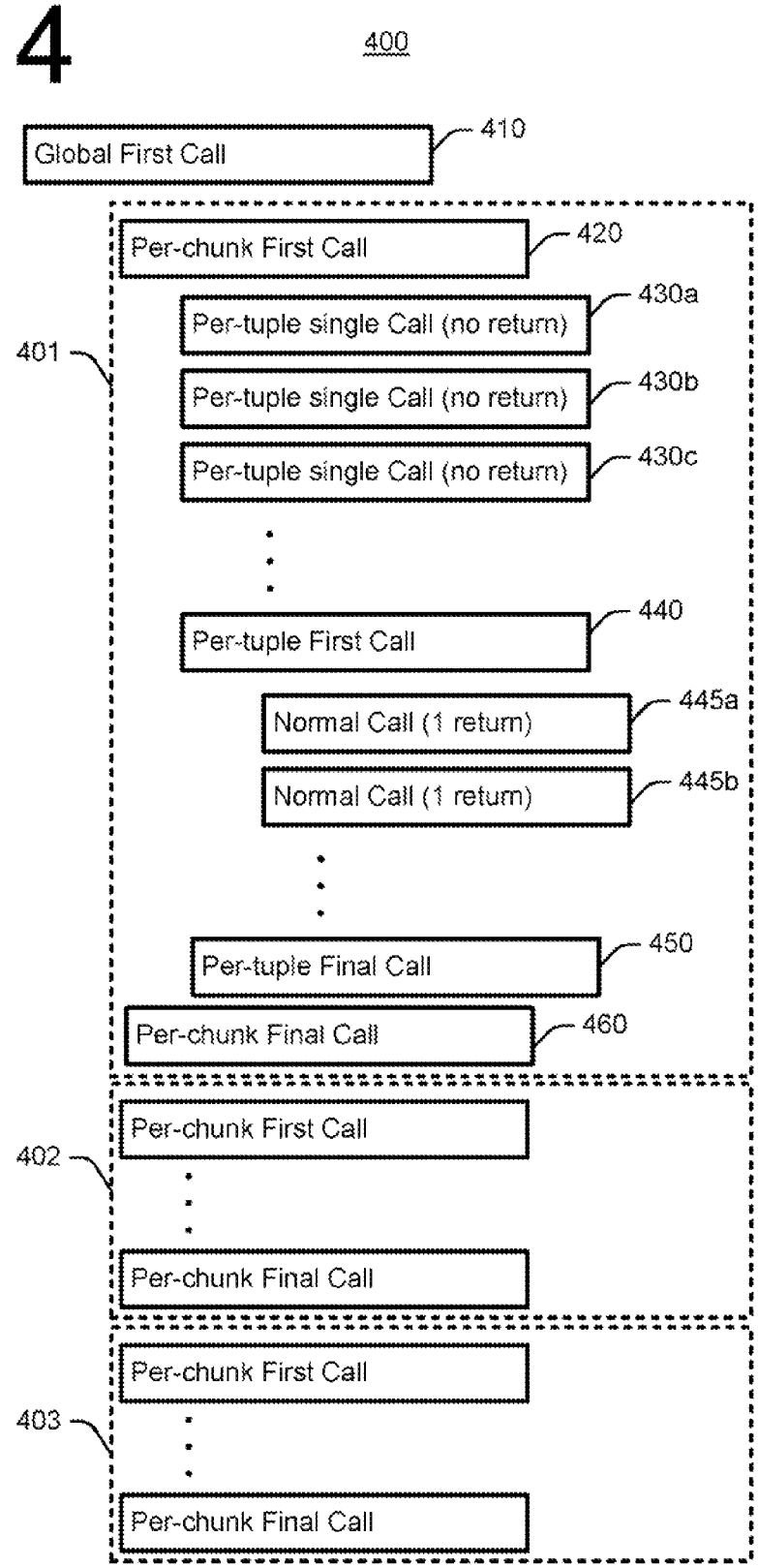
FIG. 4 shows an example of a SISO call skeleton.

FIG. 4 shows an example of a SISO UDF call skeleton 400. The Global First Call 410 sets up the function call global context for chunk-wise invocation. The Per-chunk First Call 420 sets up the chunk-based buffer for pooling data. The Per-tuple single Calls 430a-c pool tuples by vectorizing and returning Null values. The Per-tuple First Call 440 pools the last tuple in the chunk, and makes the batch analytic computation. The Normal Calls 445a-b return materialized results one tuple at a time. The Per-tuple Final Call 450 advances the chunk oriented tuple index, and returns a Null value. The Per-chunk Final Call 460 rewinds the chunk oriented tuple index, and cleans up the buffer. Of course the SISO UDF may comprise multiple calls 401-403.

In an example, the SISO UDF can be supported in the PostgreSQL engine by extending the function invocation skeleton and by extending the UDF accessible state hierarchically in the memory context of function execution. For comparison, the invocation skeleton of the scalar UDF is illustrated below.

Global First Call

---

Per-tuple Normal Call (1 return)

:

Last Call (optional and system specific)

---

The invocation skeleton of the table UDF is also illustrated below.

Per-tuple First Call

---

Normal Call (1 return)

:

Last Call

:

Thus in an example, the invocation skeleton of the SISO UDF is illustrated below.

Global First Call

---

Per-chunk First Call
Per-tuple Single Call (except the lats tuple in the chunk, no return)
:
Last-tuple First Call (for the last tuple in the chunk, computation)
   Normal Call (1 return)
:
Last-tuple Last Call
Per-chunk Last Call
:

---

The actions taken in different kinds of calls of SOSU UDF execution can be understood as follows. The Global First Call is used to set up the function call global context for chunk-wise invocation. The Per-chunk First Call is used to set up the chunk-based buffer for pooling data. The Per-tuple Single Call for chunk processing (except for the last tuple in the chunk) is used to Pool tuples, while returning Null values. This is also referred to as "vectorizing." Then for the last tuple in the chunk, the Last-tuple First Call is used to Pool the last tuple in the chunk, and make the batch analytic computation.

The Last-tuple Normal Call is used to return materialized results one tuple at a time. The Last-tuple Last Call is also used to advance the chunk oriented tuple index, and return a Null value. Finally, the Per-chunk Last Call is used to "rewind" the chunk oriented tuple index, and cleanup the buffer.

The SISO UDF block computation operators enables modeling the applications definable on tuple-sets, rather than just as individual tuples. The SISO UDF block computation also supports scalable and efficient batch processing by an external engine (e.g., SAS) through procedure calls, in addition to supporting vectorized computation by a GPU.

Before continuing, it should be noted that the examples described above are provided for purposes of illustration, and are not intended to be limiting. Other devices and/or device configurations may be utilized to carry out the operations described herein.

FIG. 5 is a flowchart illustrating example operations 500 which may be implemented for block computation. Operations 500 may be embodied as machine readable instructions on one or more computer-readable medium. When executed on a processor, the instructions cause a general purpose computing device to be programmed as a special-purpose machine that implements the described operations. In an example implementation, the components and connections depicted in the figures may be used.

SQL functions are not block operators by nature, as query processing is one tuple at a time. Therefore, the operations may be particularly desirable when implemented for a "user defined function" (UDF) used in an SQL query. In operation 510, a plurality of tuples may be buffered in a build phase. Buffering is dynamic along the query processing pipeline. For example, buffering may be chunk-wise. Chunk-wise buffering may be based on number of tuples. In other examples, buffering may be based on a time window, or based on representing individual objects.

After buffering a last of the plurality of tuples, in operation 520 a computation may be applied to all of the buffered tuples in a compute phase. The compute phase may be executed external to a query engine. In operation 530, results of the computation are returned one tuple at a time to a query processing pipeline in a stream-out phase.

The operations shown and described herein are provided to illustrate various examples for block computation. It is noted that the operations are not limited to the ordering shown. Still other operations may also be implemented.

For purposes of illustration, further operations may include buffering by multiple calls. In an example, a UDF may be called for each tuple, and a null may be returned for each call.

It is noted that the examples shown and described are provided for purposes of illustration and are not intended to be limiting. Still other examples are also contemplated.

The invention claimed is:

1. A method of block computation, the method implemented by program code stored on a non-transient computer-readable medium and executable by a processor, the method comprising:
buffering, via the processor, a chunk having a plurality of tuples received in a pipeline manner in a build phase;
after buffering a last of the plurality of tuples of the chunk, applying, via the processor, a block computation to all of the buffered tuples in the chunk during a compute phase; and
returning, via the processor, results of the block computation on the chunk, the results returned one tuple at a time to a query processing pipeline in a stream-out phase.

2. The method of claim 1, further comprising:
calling a function for each tuple in the chunk during the build phase; and
returning a null for each function called until each tuple in the chunk is buffered, and then entering the compute phase.

3. The method of claim 1, wherein the compute phase is executed external to a query engine.

4. The method of claim 1, wherein buffering is dynamic along the query processing pipeline.

5. The method of claim 1, wherein the chunk is less than a portion of data upon which an entire query is operative.

6. The method of claim 1, wherein the chunk is selected based on number of tuples.

7. The method of claim 1, wherein the chunk is selected based on a time window.

8. The method of claim 1, wherein the chunk is selected based on representing individual objects.

9. The method of claim 1, wherein buffering is by multiple calls with each of the multiple calls delivering a single return tuple.

10. A system of block computation implemented by program code stored on a non-transient computer-readable medium and executable by a processor, the system, comprising:
a buffer for holding a chunk having a plurality of tuples received in a pipeline manner during a build phase;
a computation engine for applying a block computation to all of the chunk during a compute phase after the build phase finishes; and
a query processing pipeline for returning results from the block computation on the chunk, the results returned one tuple at a time during a stream-out phase.

11. The system of claim 10, wherein the build phase finishes after a last of the plurality of tuples for the chunk is in the buffer.

12. The system of claim 10, further comprising a Set-In, Set-Out (SISO) user defined function (UDF), the UDF defining operations for a set of tuples representing a single object.

13. The system of claim 12, wherein the SISO UDF is for batch analytic computing.

14. The system of claim 12, wherein the SISO UDF receives vector input data for batch processing.

15. The system of claim 12, wherein the SISO UDF includes set-in, set-out block computation operators.

16. The system of claim 10, wherein a data source of the plurality of tuples is a table.

17. The system of claim 10, wherein a data source of the plurality of tuples is a stream.

18. A system of block computation implemented by program code stored on a non-transient computer-readable medium and executable by a processor, the system comprising:
- a computation engine for buffering a chunk having a plurality of tuples received in a pipeline manner, and for, after buffering a last of the plurality of tuples in the chunk, applying a block computation to all of the buffered tuples in the chunk;
- a user defined function (UDF) defining the block computation for the computation engine, the UDF defining operations for a tuple-set corresponding to a single time window; and
- a query processing pipeline for receiving results from the computation engine one tuple at a time.

19. The system of claim 18, wherein the UDF is set-in, set-out (SISO) modeling applications definable on tuple-sets defined by the chunk.

20. The system of claim 18, wherein the UDF has four levels of accessible states: per-function state, per-chunk state, per-tuple state, and per-return state.

* * * * *